United States Patent
Kordecki (10) Patent No.: US 12,389,876 B2
(45) Date of Patent: Aug. 19, 2025

(54) PET CONTAINER TO OVERLAY A VEHICLE SEAT

(71) Applicant: John R. Kordecki, Arlington Heights, IL (US)

(72) Inventor: John R. Kordecki, Arlington Heights, IL (US)

( * ) Notice: Subject to any disclaimer, the term of this patent is extended or adjusted under 35 U.S.C. 154(b) by 0 days.

(21) Appl. No.: 18/458,330

(22) Filed: Aug. 30, 2023

(65) Prior Publication Data

US 2024/0065223 A1 Feb. 29, 2024

Related U.S. Application Data

(60) Provisional application No. 63/474,627, filed on Aug. 30, 2022.

(51) Int. Cl.
*A01K 1/02* (2006.01)

(52) U.S. Cl.
CPC .................. *A01K 1/0272* (2013.01)

(58) Field of Classification Search
CPC .................................................. A01K 1/0272
See application file for complete search history.

(56) References Cited

U.S. PATENT DOCUMENTS

| | | | | |
|---|---|---|---|---|
| 3,436,770 A * | 4/1969 | Turner | ................... | A47D 7/002 5/118 |
| 4,512,286 A * | 4/1985 | Rux | ..................... | A01K 1/0272 119/771 |
| 4,972,532 A * | 11/1990 | Juan | ......................... | A47D 5/00 D6/333 |
| 5,123,377 A * | 6/1992 | Edwards | .............. | A01K 1/0272 119/28.5 |
| 5,133,294 A * | 7/1992 | Reid | ..................... | A01K 1/0272 119/771 |
| 5,161,484 A * | 11/1992 | Duane | .................... | A01K 1/035 5/426 |
| 5,487,361 A * | 1/1996 | Dean | ..................... | A01K 1/0272 119/28.5 |
| 5,533,785 A * | 7/1996 | Gould | .................... | B60N 3/107 297/250.1 |
| 5,785,003 A * | 7/1998 | Jacobson | ............. | A01K 1/0272 119/28.5 |
| 6,079,370 A * | 6/2000 | Al-Birmani | .......... | A01K 1/0245 119/771 |
| 6,223,691 B1 * | 5/2001 | Beattie | ................. | A45C 13/385 119/479 |

(Continued)

*Primary Examiner* — Monica L Perry
*Assistant Examiner* — Brittany A Lowery
(74) *Attorney, Agent, or Firm* — Bishop & Diehl, Ltd.

(57) ABSTRACT

A pet carrier useful as an open carrier and an enclosed kennel. The carrier is used in a vehicle and includes a base positioned directly onto a passenger seat, first and second side walls attached to the base, and first and second openings on the base, the first side wall, or the second side wall. The openings allow a safety harness to pass through each opening to engage and secure the carrier to the passenger seat. The base extends past a front edge of the seat. The side walls may be movable to provide access to an interior of the carrier and a stabilizing support attached to the base supports the extended portion. The carrier may include a carrier top configured to abut the first and second side walls. Use of the carrier top converts the carrier from the open carrier to a fully enclosed carrier.

15 Claims, 5 Drawing Sheets

(56) References Cited

U.S. PATENT DOCUMENTS

| | | | | |
|---|---|---|---|---|
| 7,966,950 | B2* | 6/2011 | Volpe, Jr. | B60N 3/002 |
| | | | | 108/115 |
| 8,091,513 | B1* | 1/2012 | Garcia | A01K 1/0272 |
| | | | | 119/28.5 |
| 2008/0184937 | A1* | 8/2008 | Hoffman | A01K 1/0272 |
| | | | | 119/28.5 |
| 2010/0139573 | A1* | 6/2010 | Wilson | A01K 1/0272 |
| | | | | 119/496 |
| 2017/0106773 | A1* | 4/2017 | Aguilar Ruelas | B60R 22/34 |
| 2019/0029217 | A1* | 1/2019 | Ryan | B60N 3/001 |
| 2019/0350163 | A1* | 11/2019 | Chinn | A01K 1/0272 |
| 2019/0352087 | A1* | 11/2019 | Williams | B60R 7/043 |
| 2021/0259198 | A1* | 8/2021 | Kamlage | A01K 1/035 |
| 2023/0116298 | A1* | 4/2023 | Florea | A01K 1/0103 |
| | | | | 224/543 |

\* cited by examiner

PET CONTAINER TO OVERLAY A VEHICLE SEAT

RELATED APPLICATION

The present application claims the filing priority of U.S. Provisional Application No. 63/474,627 titled "A Dog/Pet Platform Container to Overlay a Vehicle's Seat" and filed on Aug. 30, 2022. The '627 Provisional application is hereby incorporated by reference.

TECHNICAL FIELD OF THE INVENTION

The present invention relates to a portable pet seat or container for vehicular travel. More specifically, the invention relates to a pet carrier which allows the pet to interact with other travelers in the vehicle while remaining safe and comfortable in a semi-confined space.

BACKGROUND OF THE INVENTION

It is often an issue for pet owners to provide a safe, stable area for their pet while traveling. This can be particularly applicable to dogs, and especially larger dogs, as they can be a bit rambunctious during travel. This can present a problem not only for the pet, but also for other passengers within the vehicle, including the driver.

Further, a typical automobile seat is designed to fit a seated human's body and, as a result, does not accommodate a dog's posture very well. To even fit on most car seats, a dog is required to sit sideways. Even when sitting sideways, the cushioning found in a typical car seat may be difficult for a four-legged animal to balance itself as the vehicle moves, especially when the pet is uncontained. Without added stability or security, these conditions can be problematic due to the dog's lack of side-to-side stability when starting and stopping.

Ultimately, if the pet loses balance and falls during vehicle movement, or hits objects or passengers within the vehicle, it may result in damage to the pet, the vehicle, or other passengers. Even without causing damage, the unconstrained pet may become a distraction to the driver, which might also lead to vehicle damage, and/or passenger and pet injury.

Before the present invention, containment options required pets to be caged or physically restrained during travel by constraints or other devices. These systems prevent or at the very least limit interaction with the pet, which may cause additional stress to the animal. Other devices and systems are designed to strap an animal to the seat using harnesses or the like, but these devices fail to address the seat size issue, especially as it pertains to larger dogs. Similarly, many prior art devices and systems provide an uncovered container, but none extend forward beyond the vehicle seat, and all fail to properly accommodate access to the pet seat, especially with respect to larger dogs.

Finally, the systems and devices of the prior art are of a single use nature—i.e., they are limited to use as a car seat. The present system has a dual use as a car seat and pet kennel, which prevents the need to take both on overnight trips, for example.

Until the invention of the present application, these and other problems in the prior art went either unnoticed or unsolved by those skilled in the art. The present system provides a stable, adjustable, universal dual purpose pet container for a vehicle and a home, with priorities focused on pet safety and comfort.

SUMMARY OF THE INVENTION

There is disclosed herein an improved pet carrier which has a dual use and avoids the disadvantages of prior devices while affording additional structural and operating advantages.

The pet carrier is useful as both an open carrier and as a fully enclosed kennel. The carrier can be used in a vehicle having at least one passenger seat within the vehicle and a safety harness for securing a passenger within the at least one passenger seat. Generally speaking, the carrier comprises a base configured to be positioned directly onto the at least one passenger seat, first and second side walls attached to the base proximate the opposing side edges of the base, and first and second openings spaced apart on at least one of the base, the first side wall, and the second side wall. The openings are configured to allow the safety harness to pass through each to engage and secure the carrier to the at least one passenger seat.

In a preferred embodiment, the base has opposing side edges to define a width and opposing front and rear edges to define a depth, wherein the depth of the base is greater than a depth of the at least one passenger seat such that the base extends past a front edge of the at least one passenger seat when positioned on the at least one passenger seat.

In specific embodiments, at least one of the first and second side walls is movable to provide an access to an interior of the pet carrier. A hinge connecting at least one of the first and second side walls to the base may be used to allow pivoting between a closed position to an open position. At least one of the first and second side walls may be comprised of a first section and a second section, wherein only one of the first section and the second section is movable to provide access to the interior of the pet carrier.

In other specific embodiments, a stabilizing support attached to the base proximate the front edge. The stabilizing support may comprise as least one leg extending opposite of the side walls.

In other specific embodiments, the pet carrier may include a carrier top configured to adjoin to the first and second side walls. Use of the carrier top converts the carrier from the open carrier to a fully enclosed carrier.

The disclosed carrier fulfills the need for a steady, level, solid surface for a dog, or any pet, to sit or stand on, including a solid level surface to overlay a cushioned vehicle seat for the pet to stand, sit or lay on.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-5, there is illustrated at least one embodiment of a pet carrier, generally designated by the numeral 10. The particular illustrated carrier 10 is for a vehicle rear seat. However, while all the embodiments illustrated are directed to a rear bench seat in a car, it should be understood that the principles of the invention can be more broadly applied to use in a truck, SUV, camper, boat, van, and any other similar vehicles.

Figure 1:
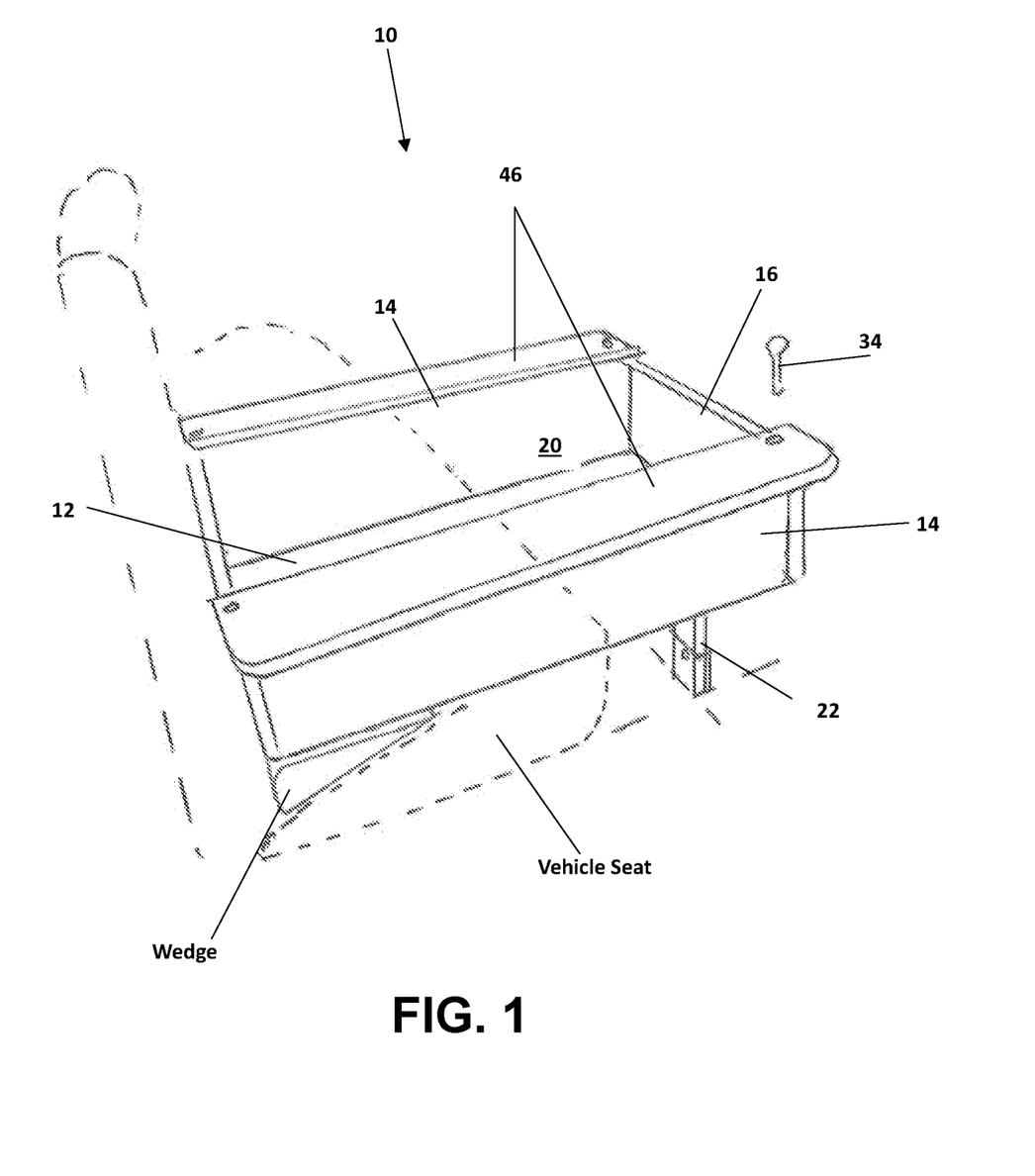
FIG. 1 is a perspective view of an embodiment of the disclosed pet carrier as it is positioned on a vehicle seat.

As can be seen in FIG. 1, an embodiment of the disclosed carrier 10 is comprised of a base 12 and preferably three walls: first and second side walls 14, and end wall 16. The walls, 14 and 16, attach about the periphery of the base 12, and extend upward to define a containment area 20. The containment area 20 can be almost any size to suit or match a particular pet size, but is preferably built for medium, large, and extra-large pets.

The base 12 has a width (measured side to side) and length (measured front to back) and is preferably comprised of a rigid material with a textured, non-slip surface to best accommodate pets during travel and for easy clean-up. The width of the base is preferably in the range of 18 inches to 36 inches, while the length is preferably in the range of 18 inches to 42 inches. Preferably, the base 12 length should extend approximately 7-10 inches beyond the seat edge. Similarly, the side walls 14 and end wall 16 should be of a structurally solid and rigid material. These walls, 14 and 16, should match the relevant dimensions of the base 12 and be at least four inches tall, preferably at least six inches, and for some uses they may be up to 12 inches tall.

A rear wall (not shown) may be used in alternate embodiments but is preferably omitted to provide better positioning of the carrier 10 on a seat, as illustrated in FIG. 1. A stabilizing support 22 is attached to an underside surface of the base 12 and extends downward, in a direction opposite the side walls 14. The stabilizing support 22 is preferably a single leg of adequate dimensions to support the front end of the carrier 10 as it extends beyond the front edge of the car seat, as described above. That is, there should be a significant length of the carrier 10 which is not supported by the car seat. To prevent rocking or tipping of the carrier 10, the stabilizing support 22 must be long enough to reach the vehicle floor. For this reason, the stabilizing support 22 can be extendible to accommodate different seat heights. The support 22 may be made of telescoping sections, a single adjustable leg, or any other suitable method known by those of skill in the art. Further, while a single leg is suitable for most applications, multiple legs may be useful for heavier pets and/or better stability of the carrier 10.

In an alternate embodiment, the base 12 can include a slight downward angle on the extended portion to provide greater headroom for larger dogs. This would still provide a solid surface for the pet to stand, sit, and recline within the carrier, but would accommodate a dog standing forward of the seat edge.

Figure 2:
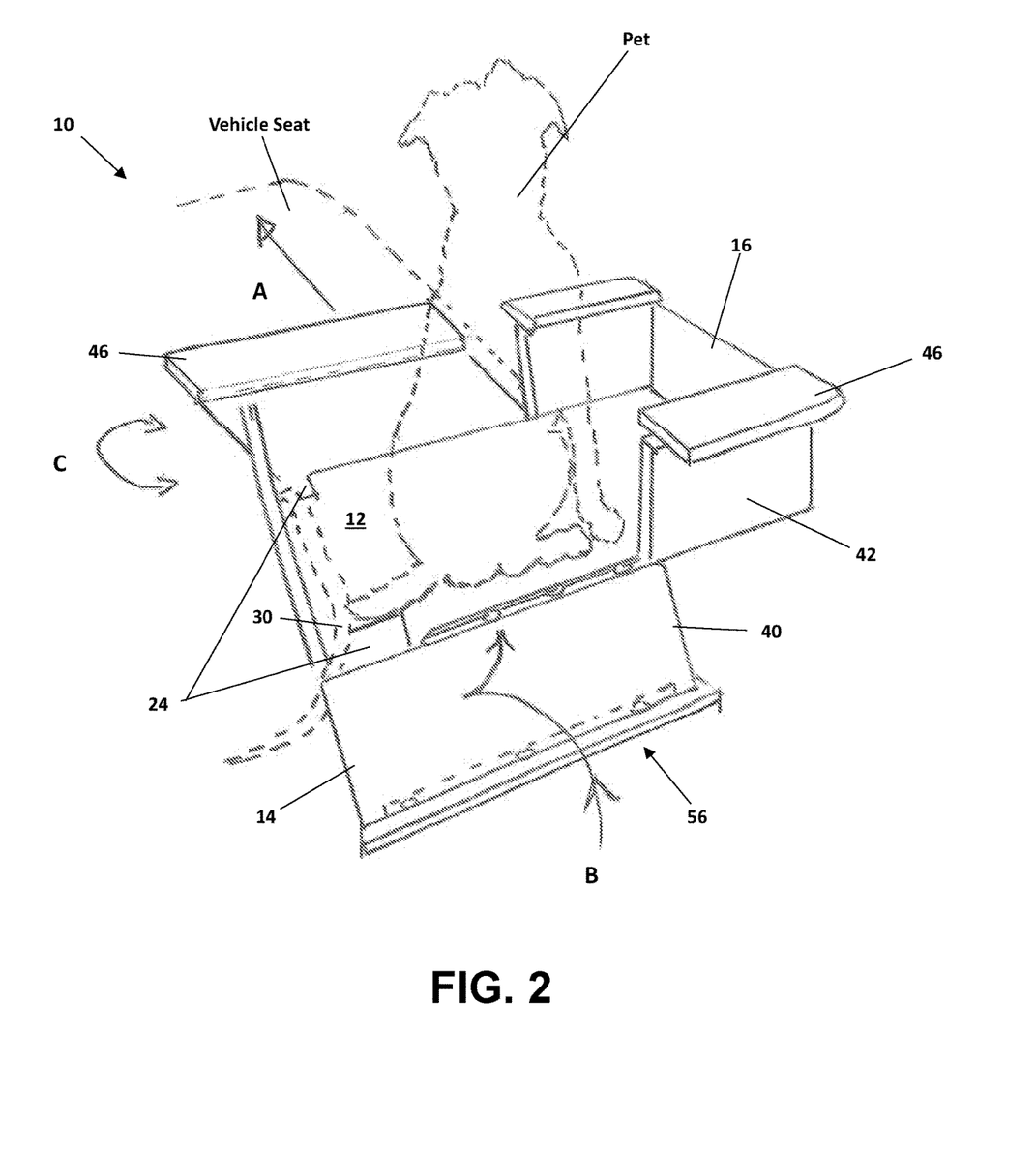
FIG. 2 is a perspective view of another embodiment of the disclosed pet carrier illustrating different features of the system.
Figure 3:
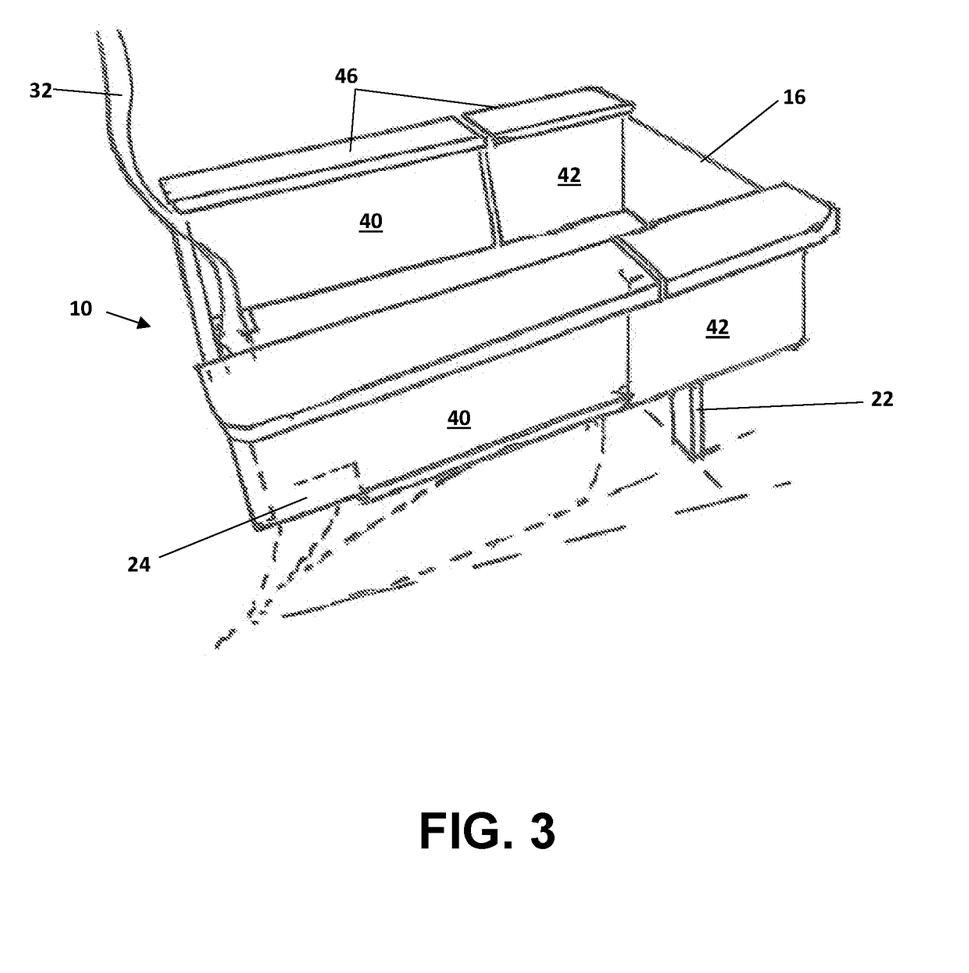
FIG. 3 is a perspective view of the embodiment of FIG. 2 illustrating use of a shoulder strap with the pet carrier.

Referring now to FIG. 2, the base 12 is shown to include two openings 24 at the rear edge. These openings 24 allow a safety belt (or safety harness) 30 to pass through and buckle the carrier 10 to the car seat. A shoulder strap 32 may also be used in securing the carrier 10, as illustrated in FIG. 3. If a back panel is used for the carrier 10, the shoulder strap 32 may secure to the panel in some manner before passing through the opening 24 for coupling with a buckle.

In use, the base 12 should be positioned directly onto the at least one passenger seat of the vehicle. The carrier should be preferably positioned on a back seat but may alternately be placed on a front passenger seat. As previously mentioned, the base 12 has opposing side edges to define a width and opposing front and rear edges to define a depth, with the depth of the base 12 preferably being greater than a depth of the at least one passenger seat. This means that the base 12 will extend past a front edge of the at least one passenger seat when positioned on the passenger seat.

To help stabilize the carrier 10, the stabilizing support 22 is attached to the base 12 proximate the front edge. As previously noted, the stabilizing support 22 is preferably adjustable in length. This allows the stabilizing support 22 to be extended and shortened to accommodate different seat heights. Further, the carrier 10 can be maintained at a slight rearward incline by extending the stabilizing support 22 to elevate the front edge. The incline can be more conducive to providing stability for the pet in the carrier 10.

The first and second side walls 14 attach to the base 12 proximate the opposing side edges of the base and are preferably hinged (see FIG. 2). This allows either (or both) side wall 14 to be moved between an open position—i.e., lowered for easy access and pet entry to the carrier 10—and a closed position. The hinged side wall 14 further allows the space to be expanded by leaving an inside side wall 14 in the down position—e.g., when the vehicle is stopped for any length of time to provide even more room for the pet. While not shown, the side walls 14 may be movable in other ways to create an opening for access, including being removable, slidable, or side hinged to open much like a car door. A locking mechanism 34 should be used to retain the side wall 14 in a closed position during travel. While a locking pin 34 is illustrated, many different locking mechanisms would be suitable for use and are well-known by those of skill in the art.

Figure 4:
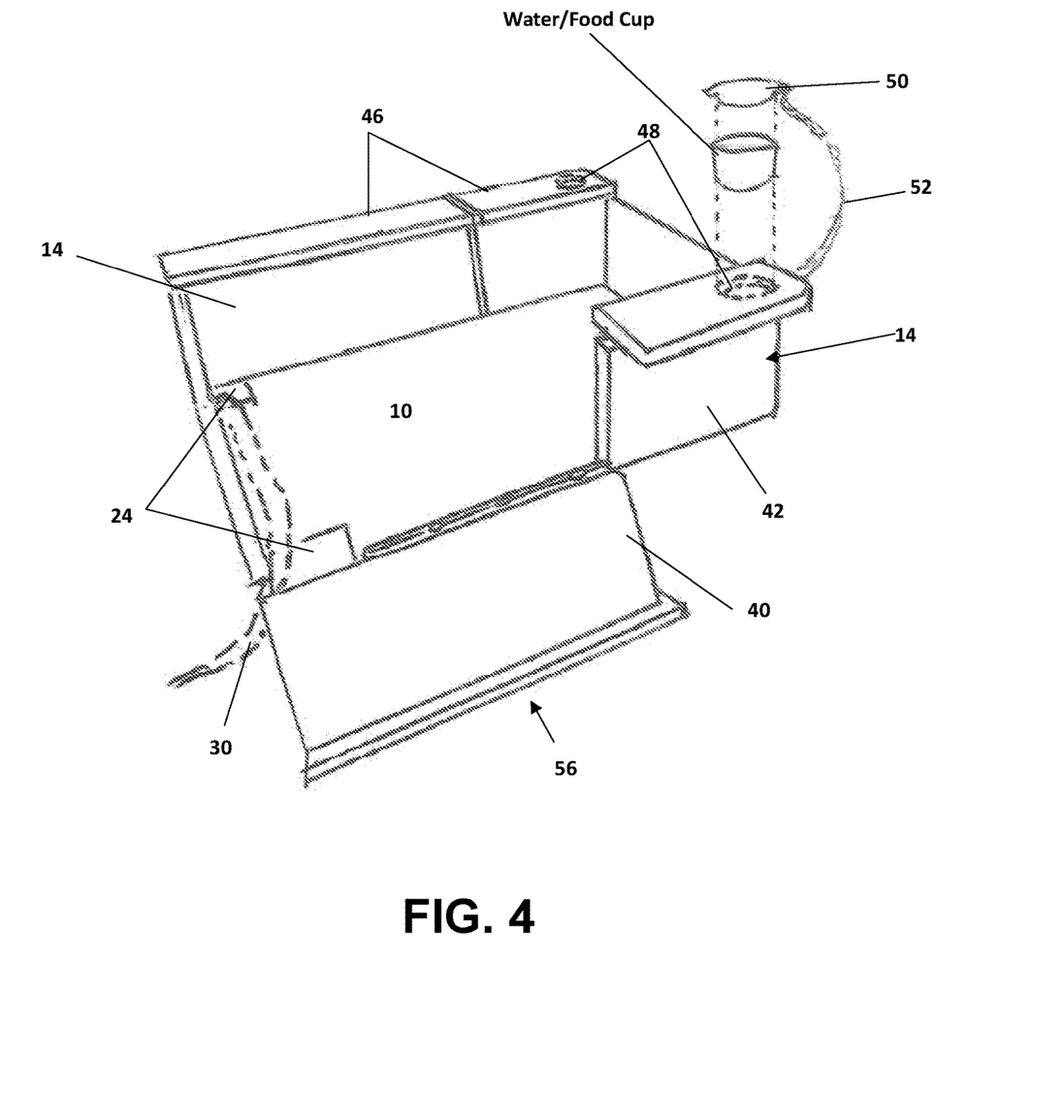
FIG. 4 is a perspective view of another embodiment of the disclosed pet carrier with additional food and water bowl features.

As shown in FIGS. 2-4, the first and second side walls 14 may be divided into a first section 40 and a second section 42, with only one of the two sections, 40 and 42, being movable, preferably hinged to provide access to the interior of the pet carrier 10. As with the full side walls 14, a locking mechanism 44 should be used to retain the hinged section, 40 or 42, in a closed position during travel. Arrow A illustrates access potential by a pet with the ability to fold down hinged section 40, while Arrow B demonstrates the option for a pet to move to another area of the vehicle with hinged section 40 laid flat. These are features which especially accommodate larger dogs. Arrow C indicates the universal fit for the carrier 10, allowing either side to hinge into a ramp or make a flat surface for extra room.

As an alternate feature of the carrier 10, a shelf member 46 may be attached to the upper edge of at least one of the first and second side walls 14. The attachment may be static, or the shelf may be hinged with the capability of locking into position. The shelf member 46 has numerous functions and benefits. For example, it can be used by the confined pet as a place to lay its head during travel.

With the addition of a cup holder-type opening or recess 48, the shelf can also be used to hold water or food, as illustrated in FIG. 4. A cap 50, attached to the side wall 14 by a tether 52, may even be provided to prevent spills during travel. The cap 50 can be fitted to secure over the opening/recess 48 when not being used.

Returning to FIG. 2, the shelf member 46 is illustrated to have an important additional use: as a step. When the carrier 10 is positioned and secured into a vehicle seat, the hinged portion 40 of the side wall 14 can be moved to an open position. In this position the shelf member 46 which extends on both sides of the side wall 14, serves as a small step 56 to be used by the pet to enter the vehicle and the carrier 10. This is a significant advantage, especially for older dogs, timid dogs, large dogs, and even small dogs, to make access to the carrier 10 very easy.

Figure 5:
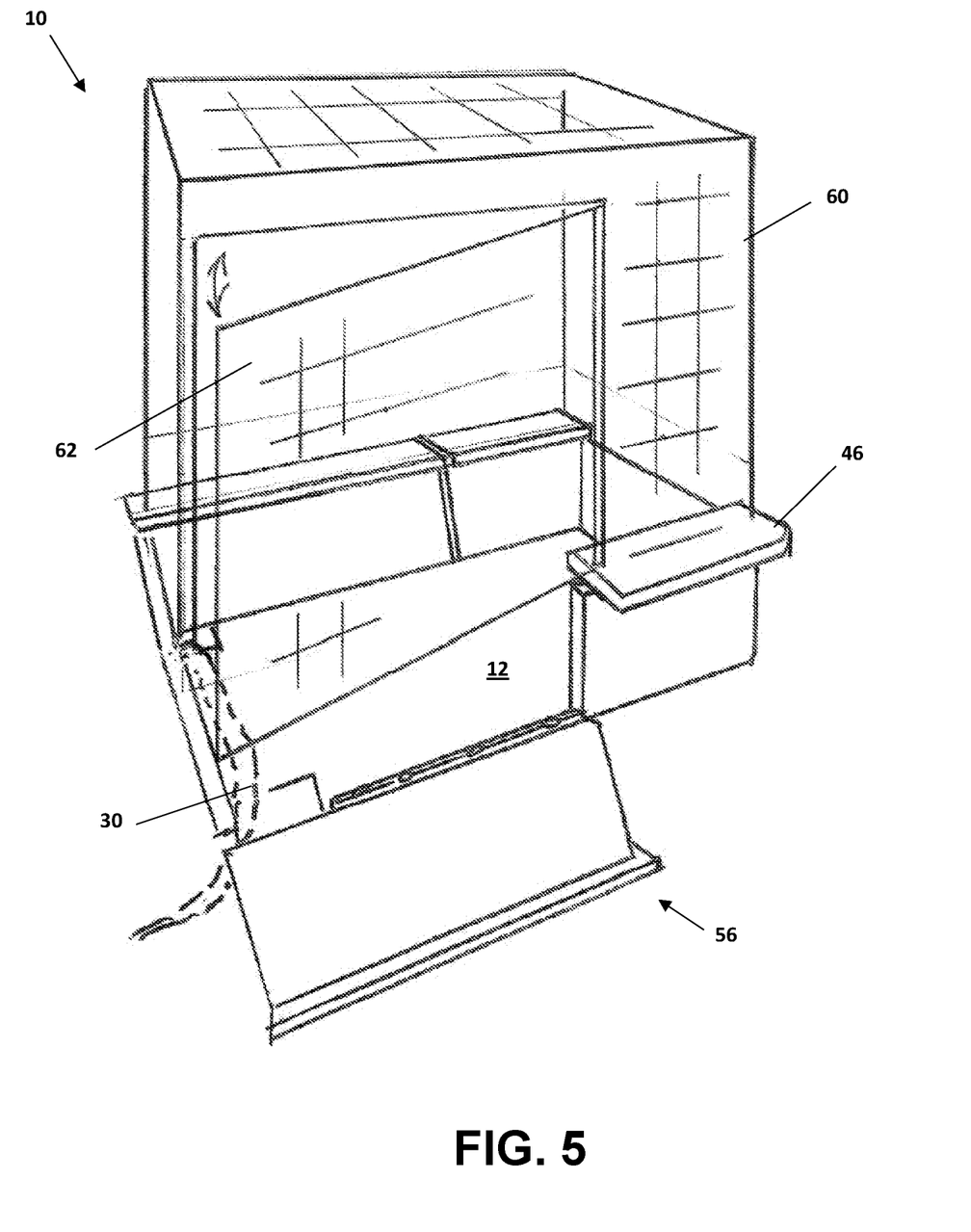
FIG. 5 is a perspective view of an embodiment including an optional kennel top.

Finally, as shown in FIG. 5, the disclosed carrier 10 can double as a pet kennel by adding a top 60 configured to mate with the walls, 14 and 16. The kennel top 60 is preferably made from common materials, such as metal wire, molded plastic, or the like, and preferably includes openings, such as door 62, as necessary. As to mating, the top 60 can be made as simple as just lying on the carrier 10 or it can be connected by means known to those skilled in the art. The top 60 may also be designed to collapse (e.g., fold) for easy storage when not in use. The top 60 can be used on the carrier 10 any time the pet needs to be contained and limit access to the vehicle interior. Some pet owners find that their pet is calmer and less anxious when they have a confined area for at least a portion of the day, whether it is during travel or at home. The present system provides this "safe space" for pets.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A pet carrier for a vehicle having at least one passenger seat within the vehicle and a safety harness for securing a passenger within the at least one passenger seat, the carrier comprising:
    a base configured to be positioned directly onto the at least one passenger seat, the base having opposing side edges to define a width and opposing front and rear edges to define a depth, wherein the depth of the base is greater than a depth of the at least one passenger seat such that the base extends past a front edge of the at least one passenger seat when positioned on the at least one passenger seat;
    first and second side walls attached to the base proximate the opposing side edges of the base;
    first and second openings spaced apart on at least one of the base, the first side wall, and the second side wall, wherein the openings are configured to allow the safety harness to pass through each to engage and secure the carrier to the at least one passenger seat;
    wherein at least one of the first and second side walls is comprised of a first section and a second section, wherein only one of the first section and the second section is connected by a hinge to the base to create a hinged section which pivots between an open position and a closed position and provides an access to and from an interior of the pet carrier when in the open position; and
    a shelf member attached to an upper edge of the hinged section, wherein the shelf member creates:
    a horizontal support surface when the hinged section is in the closed position; and
    a step for a pet to access and exit the carrier when the hinged section is in the open position.

2. The pet carrier as set forth in claim 1, further comprising a stabilizing support attached to the base proximate the front edge.

3. The pet carrier as set forth in claim 2, wherein the stabilizing support comprises at least one leg extending opposite of the side walls.

4. The pet carrier as set forth in claim 1, further comprising a locking mechanism to retain the at least one of the first and second side walls in a closed position.

5. The pet carrier as set forth in claim 1, wherein at least one of the first and second side walls is comprised of a first section and a second section, wherein only one of the first section and the second section is movable to provide access to the interior of the pet carrier.

6. The pet carrier as set forth in claim 1, further comprising a locking mechanism to retain the hinged section in a closed position.

7. The pet carrier as set forth in claim 1, further comprising a shelf member attached to at least one of the first side wall and the second side wall.

8. The pet carrier as set forth in claim 7, further comprising a recess in at least one shelf member attached to at least one of the first side wall and the second side wall.

9. The pet carrier as set forth in claim 1, further comprising a carrier top configured to adjoin to the first and second side walls.

10. A pet carrier for a vehicle having at least one passenger seat within the vehicle and a safety harness for securing a passenger within the at least one passenger seat, the carrier comprising:
    a base configured to be positioned directly onto the at least one passenger seat, the base having opposing side edges to define a width and opposing front and rear edges to define a depth, wherein the depth of the base is greater than a depth of the at least one passenger seat such that the base extends past a front edge of the at least one passenger seat when positioned on the at least one passenger seat;
    first and second side walls attached to the base proximate the opposing side edges of the base, wherein at least one of the first and second side walls is attached to the base by a hinge member;
    first and second openings spaced apart on at least one of the base, the first side wall, and the second side wall, wherein the openings are configured to allow the safety harness to pass through each to engage and secure the carrier to the at least one passenger seat; and
    a stabilizing support attached to the base proximate the front edge and extending in a direction substantially opposite the first and second side walls;
    wherein at least one of the first and second side walls is comprised of a first section and a second section, wherein only one of the first section and the second section is connected by a hinge member to the base to create a hinged section which allows pivoting between an open position and a closed position and provides an access to and from an interior of the pet carrier; and a shelf member attached to an upper edge of the hinged section wherein the shelf member creates:

a horizontal support surface when the hinged section is in a closed position; and a step to allow a pet to access and exit the interior of the carrier when the hinged section is in an open position.

11. The pet carrier as set forth in claim 10, further comprising a locking mechanism to retain the hinged section in a closed position.

12. The pet carrier as set forth in claim 10, further comprising a shelf member attached to at least one of the first side wall and the second side wall.

13. The pet carrier as set forth in claim 12, further comprising a recess in at least one shelf member attached to at least one of the first side wall and the second side wall.

14. The pet carrier as set forth in claim 10, wherein the stabilizing support is adjustable.

15. The pet carrier as set forth in claim 10, further comprising a kennel top configured to adjoin with the first and second side walls.

\* \* \* \* \*